United States Patent Office 3,511,964
Patented May 12, 1970

3,511,964
PLANT FOR WELDING BEAMS TO A METAL SHEET
Mikhail Matveevich Polyakov, Ul. Perova 9, kv. 4, and Alexei Maximovich Drozhzhenikov, 2 Nagorny Mikroraion 5, kv. 35, both of Gorky, U.S.S.R.
Filed Sept. 14, 1967, Ser. No. 667,742
Int. Cl. B23k 9/12
U.S. Cl. 219—125                               4 Claims

ABSTRACT OF THE DISCLOSURE

A plant for welding beams to a metal sheet is provided with a roller friction mechanism for moving the parts to be welded while clamping them to each other during the welding operation, there being several welding heads capable of performing relative movement with respect to one another across the width of the welding plant. The roller friction mechanism includes an individual pressure roller secured to each of said heads and acting upon an associated beam, and a common supporting shaft, disposed above the level of a bearing surface of a handling arrangement to cooperate with the pressure heads to clamp the parts to be welded.

---

The present invention relates to plants for welding beams to sheet metal, preferably in flat ship sections.

The prior art methods of fastening beams to sheet metal involve preliminary marking out of the sheet so as to suit the beams to be welded; placing of the beams on the sheet according to the marking with the help of various clamping means for example, clamps, wedges, or hydraulic clamping devices; preliminary fastening of the beams for welding and welding of these beams to a metal sheet.

The fastening of the beams to the metal sheet by means of clamps and wedges or hydraulic clamping devices provided with individual grips ensures the compression of the parts to be welded, but requires a great expense of manual labor; furthermore, a sufficient accuracy in arranging the beams on the metal sheet is not always ensured.

Therefore, for a more accurate disposition of the beams on the sheet and for a partial mechanization of the welding process, it has been already proposed to provide hydraulic clamping devices on a gantry in such a way as to simultaneously act on the entire length of the beam, pressing it to the sheet which is located on a flat support. A plant for welding beams to the metal sheet with the use of hydraulic clamping devices, provided on a gantry, is described in the American magazine "Machinery," November 1941, in the article "Welding by the Unionmelt method." In this case, when local deformations of beams in the vertical plane occur, it is practically impossible to obtain a tight compression of the parts to be welded to one another, since the rigidity of the beam considerably exceeds that of the sheet, which is likely to result in a gap left between the parts to be welded, this being unacceptable when taking into account the welding conditions.

Hence, the prior art methods and arrangements require the preliminary marking out of the sheet which is a time-consuming operation and does not always allow the required quality of welded structures to be obtained.

Known heretofore is also a plant for manufacturing T-beams by welding two flat components i.e. flange and web, wherein the preliminary marking out and locating of the components according to the marking out are not required. The plant is provided with a system of guide rollers controlling the mutual arrangement of the parts to be welded, use being made in said plant of a frictional roller appliance for moving said parts on a handling device and clamping these to each other in the welding process.

An advantage of the prior-art plant consists in that it ensures a permanent contact of the parts to be welded with in the welding zone, needs no preliminary marking, and provides for the mechanization of the welding process.

A simple increase in the dimensions or number of the existing plants for a simultaneous welding of a plurality of beams to the sheet proves to be impracticable for the following reasons.

It is well known that beams are manufactured in such a manner that they vary as to their height and, as a rule, have a different sag in in the vertical plane, said variations exceeding considerably the admissible welding gap between the parts to be welded. This calls for means to exert pressure on each particular beam and on the common bearing surfaces, since the beams are arranged at various distances from one another across the sheet width.

Consequently, it is the principal object of the invention to provide a plant for wielding beams to a metal sheet, whose friction roller mechanism has a common bearing surface and is capable of exerting a pressure on each beam separately, irrespective of its height, sag, and arrangement with respect to the sheet width.

The invention contemplates a plant for welding beams to a sheet, provided with a friction roller mechanism, which is intended for moving the parts to be welded on a handling device and clamping said parts to each other in the welding process. In conformity with the invention, a number of welding heads employed in the welding plant are installed in such a manner as to be capable of relative motion with respect to each other across the plant width, while the roller mechanism comprises an individual clamping roller secured on each welding head and acting upon the beam, and a common supporting shaft which is disposed above the level of the bearing surface of the handling device.

The disposition of the supporting shaft above the bearing surface of the handling device is required for preventing the deformation of the beams by the value of their local distortion when clamped to the sheet, since otherwise the clamping forces increase in proportion with a difference in the rigidity of the beams and sheets relative to the horizontal axis.

An advantage of the invention consists, first of all, in that it considerably reduces the time required for welding beams to a sheet, since the operations of preliminary marking and fastening of the parts to be welded are eliminated, while the operations of adjusting the parts to be welded, their clamping and welding are effected in one production cycle.

Another advantage of the invention consists in an improved accuracy of the arrangement of the beams on the sheet, whose deviations from the nominal position do not exceed ±1 mm., which is important for performing subsequent assembly operations.

The nature of the present invention will become more fully apparent from a consideration of the following description of an exemplary embodiment thereof, taken in conjunction with the accompanying drawing, wherein.

Figure 1:
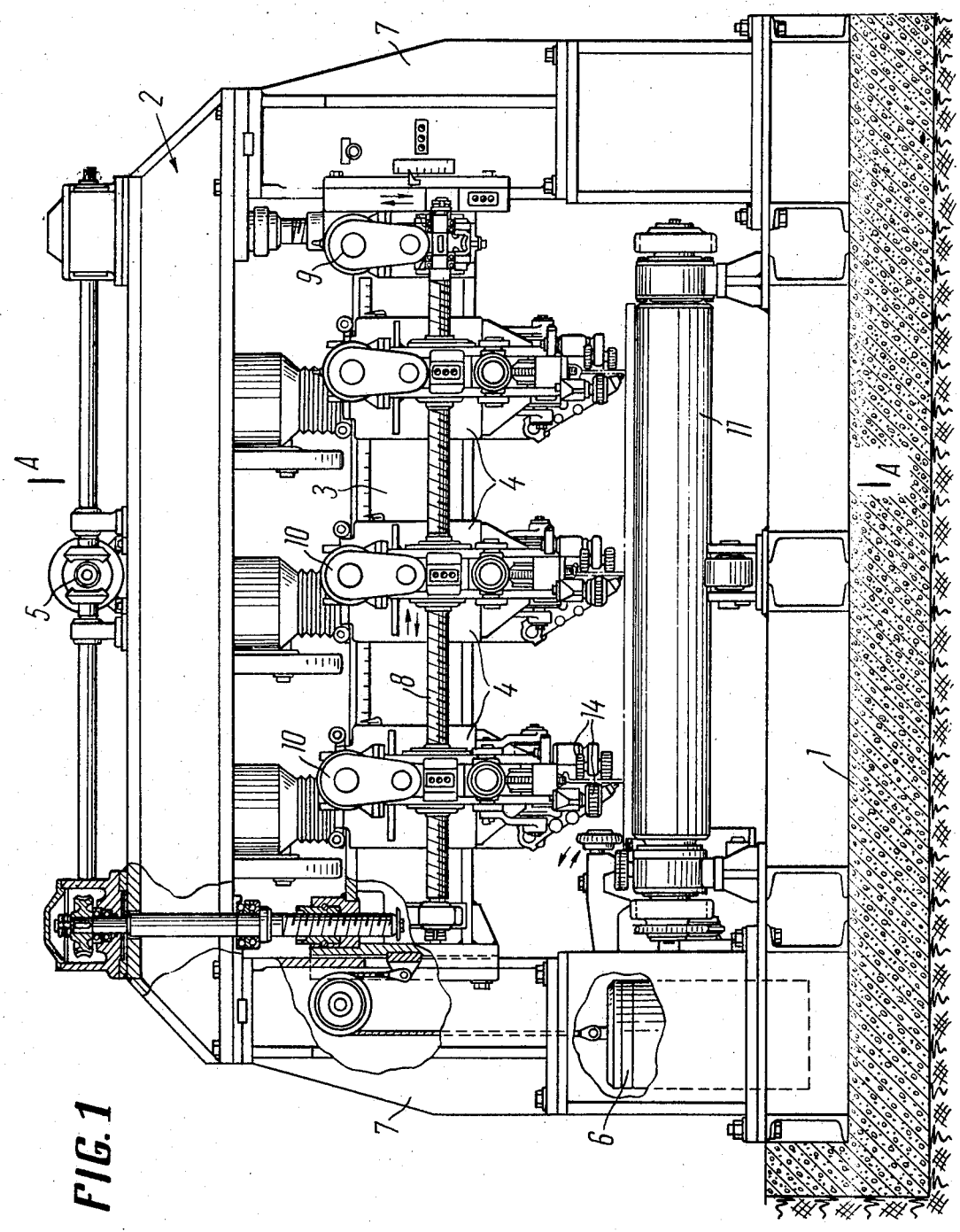
FIG. 1 is an end elevation view partly in section of a plant for welding beams to a metal sheet according to the present invention.

The plant (FIGS. 1 and 2) comprises a gantry frame 2 mounted on a foundation 1, said gantry frame mounting a cross-piece 3 supporting welding heads 4, being moved throughout the height of the gantry frame 2 by means of a drive 5. To relieve the drive 5, the cross-piece 3 is counterbalanced by weights 6 disposed on uprights 7 of the gantry frame 2.

Figure 3:
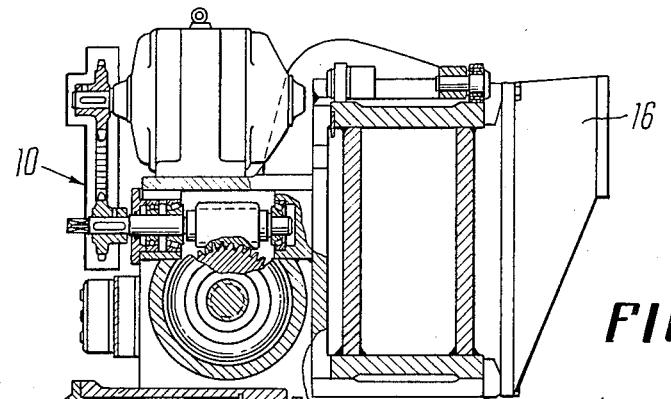
FIG. 3 is a side view of a welding head of the plant, shown partially cut away.
Figure 3:
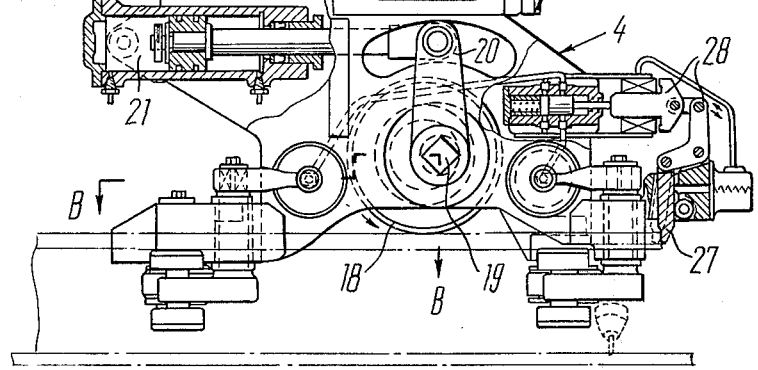

The welding heads 4 are disposed on the cross-piece 3 in such a manner as to be movable across the width of the gantry frame 2 by means of a lead screw 8, driven in rotation by a drive 9, while for the individual adjusting of the welding heads 4 there are provided worm drives 10 shown in detail in FIG. 3.

Disposed in the botom portion of the gantry frame 2 is a supporting driving shaft 11, driven in rotation by an adjustable electric motor through a reduction gear 12.

Figure 2:
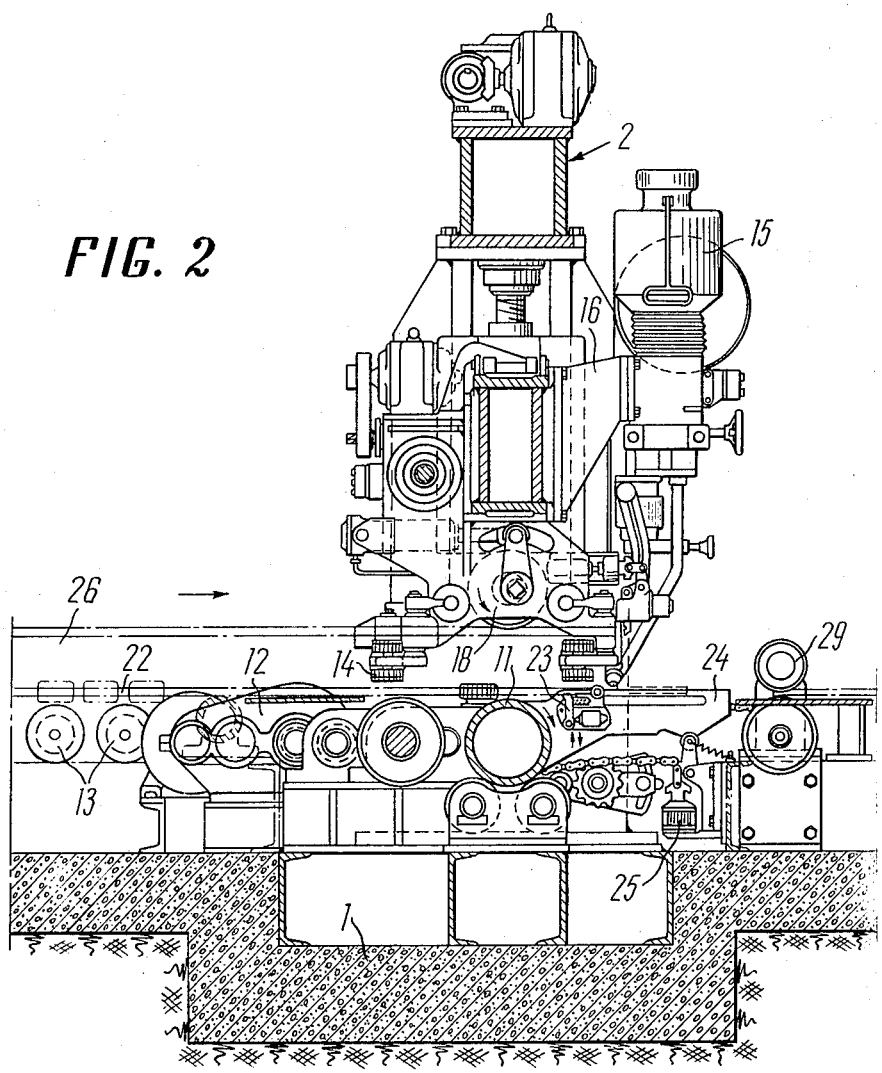
FIG. 2 is a cross-sectional view, taken on the line A—A of FIG. 1.

As it is shown in FIG. 2, the supporting shaft 11 has a peripheral surface disposed above the surface of the handling arrangement 13 (being essentially a driven roller table) which moves the parts to be welded.

Figure 4:
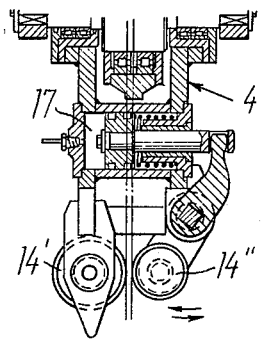
FIG. 4 is a cross-sectional view, taken on the line B—B of FIG. 3.

Each welding head 4 (FIGS. 2, 3) is provided with two pairs of rollers 14 for adjusting the beams, said rollers being disposed in front of a welding arrangement 15 mounted on a bracket 16 of the welding head 4. In each pair of the rollers 14, one roller 14' (FIG. 4) is essentially a rigid lateral support for the beam, while another roller 14" is movable in a plane parallel to the axis of the supporting shaft 11 by a power cylinder 17, built in the welding head 4.

For clamping the beams to the sheet, there is mounted on the welding head 4 a pressure roller 18 eccentrically fitted onto an axle 19 and move vertically by a rocker arm 20 actuated by a rocking cylinder 21.

The pressure rollers 18 of the welding heads 4 together with the supporting shaft 11 constitute a friction roller mechanism for moving the parts to be welded on the handling arrangement 13, and for clamping them to each other during the welding process.

Prior to starting the welding operation, the welding heads 4 are adjusted according to the specified dimensions of the parts to be welded.

The handling arrangement 13 is employed for feeding a sheet 22 until it encounters a thrust member 23 (FIG. 2), secured on a rocking bracket 24, which is freely fitted on the supporting shaft 11. The thrust member is operatively connected with the drive of the handling arrangement 13 and with a drive 25 for rotating the bracket 24 in such a manner that when the sheet is in contact with the thrust member 23, the drive of the handling arrangement is switched off, and the bracket 24 descends together with the thrust member 23.

Alternatingly inserted into the guiding rollers 14 of the welding heads 4 are beams 26 until they meet the thrust member 27 (FIG. 3) which is operatively connected to a lifting arrangement 28 and the power cylinder 17 which clamps the movable roller 14" to the beam.

Rollers 18, by means of the cylinders 21, clamp the beams 26 against the sheet 22, and the welding apparatus 15 is switched on, whereupon the electric motor of the supporting shaft 11 is actuated.

Under the action of the friction force set up between the supporting shaft 11 and the metal sheet 22, the latter is moved together with the beams 26 in relation to the welding apparatus 15.

At the moment the beams 26 emerge from under the clamping rollers 18, a roller friction mechanism 29 is automatically actuated, being mounted on the frame of the handling arrangement 13, said roller friction mechanism being intended for moving the articles to be welded until the welding operation is completed and said articles are withdrawn from the welding apparatus.

The present invention is not limited by its exemplary embodiment thus described, and there may be allowed modifications thereof without departing from the spirit and scope of the invention.

What is claimed is:

1. A plant for welding a plurality of beams to a common metal sheet comprising a handling arrangement having a bearing surface on which the parts to be welded are supported and advanced, a plurality of welding heads each associated with a respective beam, means supporting the welding heads for relative movement with respect to one another across the width of the plant; roller friction means for receiving the parts to be welded from said handling arrangement and for advancing the parts by clamping said parts to each other, said roller friction means holding said parts clamped during the welding operation, said roller friction means including an individual pressure roller secured to each of said heads, each said roller acting upon the associated beam, and a common supporting shaft disposed beneath said heads, said supporting shaft having a supporting surface at a level above the bearing surface of said handling arrangement.

2. A plant as claimed in claim 1 comprising a pair of adjustment rollers on each head for lateral adjustment of the associated beam.

3. A plant as claimed in claim 2 wherein one of said adjustment rollers is fixed and the other pivotable to engage the beam and positon the same against the fixed adjustment roller.

4. A plant as claimed in claim 1 comprising means for adjusting the vertical position of the pressure roller in each head.

References Cited

UNITED STATES PATENTS

| 1,838,899 | 12/1931 | Arnold | 219—125 |
| 3,154,665 | 10/1964 | Dunning et al. | 219—124 |
| 3,164,713 | 1/1965 | Banks et al. | 219—124 |

FOREIGN PATENTS

| 255,875 | 7/1967 | Austria. |
| 968,420 | 9/1964 | Great Britain. |

JOSEPH V. TRUHE, Primary Examiner

L. A. SCHUTZMAN, Assistant Examiner

U.S. Cl. X.R.

219—124